(12) United States Patent
Cirillo et al.

(10) Patent No.: US 10,107,896 B2
(45) Date of Patent: Oct. 23, 2018

(54) MEASURING DEVICE AND MEASURING METHOD FOR MEASURING THE AMBIGUITY FUNCTION OF RADAR SIGNALS

(71) Applicant: Rohde & Schwarz GmbH & Co. KG, Munich (DE)

(72) Inventors: Luke Cirillo, Poing (DE); Steffen Heuel, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 310 days.

(21) Appl. No.: 15/220,388

(22) Filed: Jul. 26, 2016

(65) Prior Publication Data

US 2017/0212216 A1   Jul. 27, 2017

Related U.S. Application Data

(60) Provisional application No. 62/287,891, filed on Jan. 27, 2016.

(51) Int. Cl.
*G01S 7/40*   (2006.01)
*G06G 7/78*   (2006.01)
*G01S 13/00*  (2006.01)

(52) U.S. Cl.
CPC .............. *G01S 7/4052* (2013.01); *G06G 7/78* (2013.01)

(58) Field of Classification Search
CPC ........ G01S 7/405; G01S 7/2923; G01S 13/28; G01S 13/53; G01S 13/286; G01S 13/282; G01S 13/288; G06G 7/78; H04L 25/0204; H03H 17/06
See application file for complete search history.

(56) References Cited

U.S. PATENT DOCUMENTS

| 3,641,485 | A | * | 2/1972 | Murphree | G01S 7/52004 367/1 |
| 4,016,412 | A | * | 4/1977 | Stern | G01S 7/2923 310/313 R |
| 4,028,700 | A | * | 6/1977 | Carey | G01S 13/282 342/194 |
| 4,055,758 | A | * | 10/1977 | Stern | G01S 7/2923 310/313 R |

(Continued)

FOREIGN PATENT DOCUMENTS

| EP | 2821809 A1 | 1/2015 | |
| GB | 2189362 A | * 10/1987 | ........... G01S 13/282 |
| WO | WO2014/123433 A1 | * 8/2014 | ........... G01S 13/286 |

*Primary Examiner* — Bernarr E Gregory
(74) *Attorney, Agent, or Firm* — Potomac Technology Law, LLC

(57) ABSTRACT

A measuring device for measuring a radar signal is provided. The radar signal is generated from a digital reference signal. The measuring device comprises a memory configured to store a digitized radar signal derived from the radar signal and the digital reference signal. The measuring device further comprises a radar compression filter configured to filter the digitized radar signal, resulting in a correlation of the digitized radar signal with the digital reference signal. The measuring device further comprises a frequency shifter configured to successively perform a frequency shift of either the digital reference signal or the radar signal with at least two simulated Doppler shift frequencies.

20 Claims, 10 Drawing Sheets

(56) References Cited

U.S. PATENT DOCUMENTS

| | | | | |
|---|---|---|---|---|
| 5,047,780 | A * | 9/1991 | Dijkstra | G01S 13/28 342/145 |
| 5,160,264 | A * | 11/1992 | Banura | G01S 7/4052 342/169 |
| 5,191,347 | A * | 3/1993 | Ishikawa | G01S 13/282 342/108 |
| 5,229,775 | A * | 7/1993 | Sakamoto | G01S 13/28 342/160 |
| 5,442,359 | A | 8/1995 | Rubin | |
| 6,067,043 | A * | 5/2000 | Faure | G01S 7/4052 342/135 |
| 6,150,976 | A * | 11/2000 | Cooley | G01S 7/4052 342/165 |
| 6,753,806 | B1 * | 6/2004 | Hager | G01S 13/53 342/120 |
| 7,443,337 | B2 * | 10/2008 | Jaklitsch | H03H 17/06 327/105 |
| 8,193,972 | B2 * | 6/2012 | Hofele | G01S 13/288 342/159 |
| 2004/0028008 | A1 * | 2/2004 | Kurihara | H04L 25/0204 370/320 |

\* cited by examiner

MEASURING DEVICE AND MEASURING METHOD FOR MEASURING THE AMBIGUITY FUNCTION OF RADAR SIGNALS

RELATED APPLICATIONS

This application claims the benefit of the earlier filing date under 35 U.S.C. §119(e) of U.S. Provisional Application Ser. No. 62/287,891 (filed 2016 Jan. 27), the entirety of which is incorporated herein by reference.

TECHNICAL FIELD

The invention relates to measuring radar signals, and more specifically to measuring ambiguity functions of radar signals.

BACKGROUND

When objects are detected using radar signals, the movement of the objects generates a Doppler frequency shift of the reflected radar signal. Especially in pulse compression radar systems, in which matched filters (also referred to as receiver filters or radar compression filters) are used, such filters are set up in a complementary manner to the transmitted radar pulse. When Doppler shift due to moving objects occurs, the reception characteristic of the radar compression filter is slightly mismatched to the received radar pulse. This leads to a reduced detection performance, accuracy and possibly to erroneous range measurements of the detected object, if the Doppler frequency is not accounted for.

The behavior of a radar signal with regard to Doppler shift can be observed by the use of the ambiguity function. The ambiguity function is the correlation function of the transmitted and received radar echo signal (time delay) after passing through the radar compression filter considering different Doppler shift frequencies. Therefore, the ambiguity function is a three-dimensional function.

So far, the ambiguity function of received radar signals though is not measured, but merely simulated. At present, therefore, it is not possible to accurately determine the behavior of different radar signals, especially of different radar pulse shapes with regard to Doppler shift when considering the entire radar system including filter stages, power amplifier, signal processing etc.

The document U.S. Pat. No. 5,442,359 B1 shows an apparatus and method for mitigating range-Doppler ambiguities in pulse-Doppler radars. Although the system described therein shows options for reducing the effect of observed ambiguities, it does not allow for determining the ambiguity function of a received radar signal itself.

What is needed, therefore, is an approach for measuring the ambiguity function of radar signals.

SUMMARY

Embodiments of the present invention advantageously address the foregoing requirements and needs, as well as others, by providing approaches for a measurement device and associated measurement methods for measuring the ambiguity function of radar signals in an accurate manner.

According to a first aspect of the invention, a measuring device for measuring a radar signal is provided. The radar signal is generated from a known digital reference signal. The measuring device comprises a storage unit adapted to store a digitized radar signal derived from the radar signal and the known digital reference signal, especially for signal compression. Moreover, the measuring device comprises a radar compression filter, adapted to perform a filtering of the digitized radar signal, resulting in a correlation of the digitized radar signal with digital reference signal. The measuring device is moreover adapted to successively perform a frequency shift of the known digital reference signal or the digitized radar signal with at least two simulated Doppler shift frequencies. It is thereby possible to measure the effect of Doppler shift on the resulting pulse compressed radar signal at the output of the radar receiver.

Advantageously, according to a first implementation of the first aspect, the measuring signal is emitted by a device under test. It is thereby possible to test real-world radar signals.

According to a second implementation form of the first aspect, if the measuring device is adapted to successively perform the frequency shift of the known digital reference signal with the at least two simulated Doppler shift frequencies, the radar compression filter is adapted to perform a filtering of the digital radar signal, after each frequency shift, and measuring device is adapted to determine the correlation of the digitized radar signal with the digital reference signal, after each frequency shift. Thereby, with a very low hardware and software effort, it is possible to determine the response of the compression filter to the Doppler frequency shift.

According to an implementation form of the second implementation form of the first aspect, the measuring device is adapted to measure the radar signals filtered by the radar compression filter and to determine an ambiguity function of the radar signal from the measured digital signals, filtered by the radar compression filter and the respective Doppler shift frequencies employed. By determining the ambiguity function, it is possible to provide a graphical and easily understandable representation of the behavior of the radar signal and the radar system and the signal processing due to synthetic Doppler frequency shift of the received radar echo signals.

According to a further implementation form, the measuring device is adapted to determine at least two compression filter output signals based on the at least two simulated Doppler shift frequencies. By studying the at least two compression filter output signals, a user can easily determine the behavior of the measured radar signal, the pulse compression performance and three dimensional ambiguity function.

According to a further implementation form of the first aspect, if the measuring device is adapted to successively perform the frequency shift of the radar signal with the at least two simulated Doppler shift frequencies, the measuring device comprises a fading unit adapted to perform the frequency shift of the radar signal with the at least two simulated Doppler shift frequencies. Moreover, the storage unit is then adapted to successively store the frequency shifted radar signals as digital radar signals. The radar compression filters are then applied to perform a filtering of the digital radar signal after each frequency shift of the radar signal. Using this alternative, the received radar signal is changed in frequency, phase and amplitude as in a real world environment, which makes this approach even more convenient to derive the three dimensional ambiguity function including technical description parameters derived from the ambiguity function (e.g., time-sidelobe ratio for 1 Hz Doppler shift, 10 Hz Doppler shift, etc.) In comparison to the first implementation form of the first aspect, this implementation form requires an additional fading unit and increases hardware requirements.

Further, within the measurement device, the signal generating component and the signal analyzing component may be configured to perform the fading operation itself, thereby integrating the fading unit into the respective component.

According to an implementation form of the previously described implementation form of the first aspect, the fading unit comprises a spectrum analyzer adapted to generate a time and frequency shifted digital radar signal based on the original radar signal. The fading unit moreover comprises a signal generator, adapted to successively generate a synthetic radar signal, based upon the further digital radar signal and successively based on each of the at least two frequency shifts with the at least two simulated Doppler shift frequencies. The measuring device is then adapted to successively provide a signal derived from the synthetic radar signal to the radar compression filter as the digital radar signal after each frequency shift of the radar signal. It is thereby possible to flexibly generate the Doppler frequency shifted digital radar signal and measure the ambiguity function.

According to an implementation form of the previously described implementation form of the first aspect, the measuring device comprises a display unit and a rendering unit. The rendering unit is adapted to render an image, preferably a three dimensional image, of the at least two compression filter output signals and display it on the display unit. A very easy operation of the measuring device is thereby possible.

According to a further implementation form of the first aspect, the measuring device is adapted to determine an ambiguity function of the radar signal. By studying the ambiguity function, the user can very easily grasp the behavior of measured radar signal.

According to an implementation form of the previously described implementation form of the first aspect, the measuring device comprises a display unit. The measuring device moreover comprises a rendering unit, which is adapted to render an image, preferably a three dimensional image of the ambiguity function and display it on the display unit. An especially simple operation of the measuring device is thereby possible.

According to a preferred implementation form of the previously described implementation form of the fourth implementation form of the first aspect, the measuring device comprises an input unit, adapted to accept and register user input actions. The input unit preferably is a mouse or a touchpad or a touchscreen or a trackball, or a speech recognition unit or a gesture recognition unit. It is thereby especially easily possible to control the functions of the measuring device.

According to an implementation form of the previously described implementation form of the first aspect, the parameters of the determining of the ambiguity function are configurable by user input using the input unit. The parameters of the determining of the ambiguity function comprise a frequency range and/or a time range and/or a Doppler frequency shift range and/or a number of Doppler frequencies. It is thereby possible to customize the function of the measuring device in a very simple manner.

According to a second implementation form of the first implementation form of the first implementation form of the fourth implementation form of the first aspect, the rendering unit is moreover adapted to set parameters of the rendering according to the user input using the input unit. The parameters of the rendering comprise a frequency range and/or a time range and/or a Doppler frequency shift range and/or a number of Doppler frequencies and/or a zoom and/or a rotation of the ambiguity function and/or a shading of the ambiguity function and/or a coloration of the ambiguity function. It is thereby possible to adapt the output on the display unit according to user wishes in a very simple manner.

According to a further implementation form of the first aspect, the measuring device is adapted to successively perform a frequency shift of the known digital reference signal or the measured radar signal with at least N simulated Doppler shift frequencies. N is at least 3 and preferably 3 or 4 or 5 or 6 or 7 or 8 or 9 or 10 or 50 or 100 or 200 or 500 or 1000 or 2000 or 5000. It is thereby very flexibly possible to adapt the complexity of the measurement.

According to a second aspect of the invention, a measuring method for measuring a radar signal is provided. The radar signal is generated from a known digital reference signal. The method comprises storing a digitized radar signal, derived from the radar signal and the known digital reference signal, filtering the digitized radar signal by the radar compression filter, resulting in a correlation of the digitized radar signal with digital reference signal, and successively performing a Doppler frequency shift, for example, with at least two simulated Doppler shift frequencies, of the known digital reference signal or the radar signal. It is thereby possible to determine the behavior of the measured radar signal with regard to Doppler shift.

According to a third aspect of the invention, a measuring device for measuring a reaction of a device under test to being supplied with a radar signal, is provided. The radar signal supplied to the device under test is generated from a known digital reference signal. The measuring device comprises a storage unit adapted to store a digitized radar signal derived from a measured radar signal emitted by the device under test and the known digital reference signal, and a radar compression filter, adapted to perform a filtering of the digitized radar signal, resulting in a correlation of the digitized radar signal with digital reference signal. The measuring device is adapted to successively perform a frequency shift of the known digital reference signal or the radar signal with at least two simulated Doppler shift frequencies. An accurate measurement of the reaction of the device under test is thereby possible.

According to a fourth aspect of the invention, a measuring method for measuring a reaction of a device under test to being supplied with a radar signal, is provided. The radar signal supplied to the device under test is generated from a known digital reference signal. The method comprises storing a digitized radar signal derived from a measured radar signal emitted by the device under test and the known digital reference signal, performing a filtering of the digitized radar signal, by a radar compression filter, resulting in a correlation of the digitized radar signal with digital reference signal, and successively performing a frequency shift of the known digital reference signal or the radar signal with at least two simulated Doppler shift frequencies. An accurate measurement of the reaction of the device under test is thereby possible.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Example embodiments of the present invention are illustrated by way of example, and not by way of limitation, in the figures of the accompanying drawings, in which like reference numerals refer to similar elements, and in which.

DETAILED DESCRIPTION

Approaches for a measurement system and associated measurement methods for measuring or calibrating the amplitude of a signal produced by a signal generator, where the measurement system is based on the use of an ion trap, are described.

Similar entities and reference numbers and different figures have been partially omitted. Reference will now be made in detail to the preferred embodiments of the present invention, examples of which are illustrated in the accompanying drawings. However, the following embodiments of the present invention may be variously modified and the range of the present invention is not limited by the following embodiments.

Figure 1:
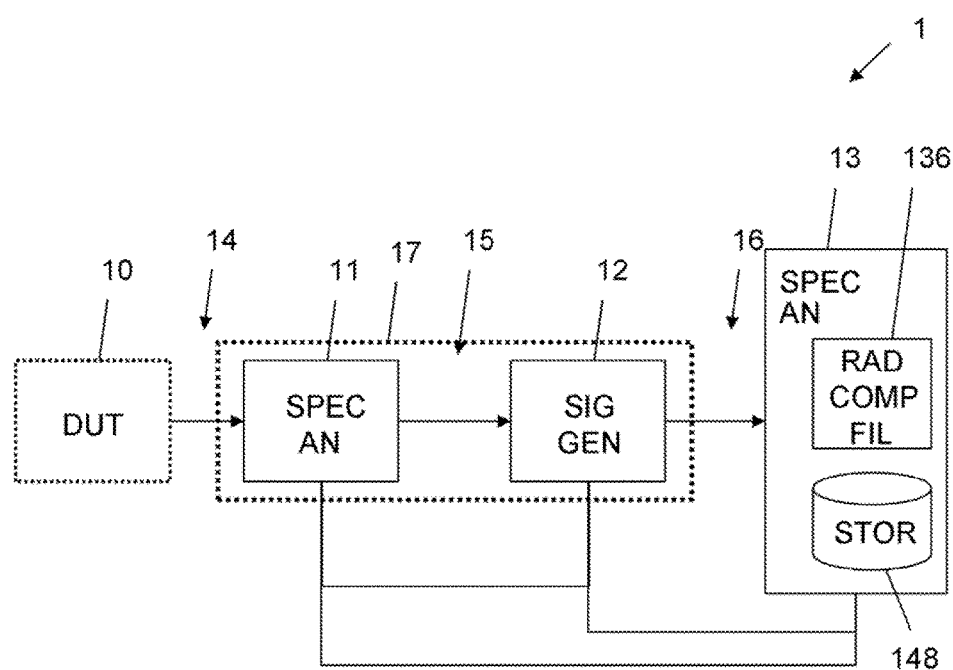
FIG. 1 shows a block diagram of a first example measuring device, in accordance with example embodiments.

FIG. 1 shows a block diagram of a first example measuring device, in accordance with example embodiments of the present invention. The measuring device 1 comprises an optional fading unit 17 connected to a function block 13, which comprises a storage unit 148 and a radar compression filter 136. By way of example, the function block 13 may be implemented as a spectrum analyzer. The fading unit 17 in this example consists of a spectrum analyzer 11 connected to a signal generator 12. The fading unit depicted in FIG. 1 shows an example configuration. Alternative configurations of a fading unit are also possible.

Moreover, the term "measuring device" may encompass several entities, which can be located in one housing, but which can also be located in different housings. The measuring device 2 can also be constituted by a system of individual measuring devices.

An optional device under test 10 emits a radar signal 14 generated based upon a known reference signal. The radar signal 14 is provided to the fading unit 17, which generates a synthetic radar signal 16 from the radar signal 14, and provides the synthetic radar signal to the function block 13. By way of example, the synthetic radar signal 16 is generated by the fading unit 17 by adding fading. This means that at least a frequency shift by a simulated Doppler shift frequency is added.

The device under test 10 is an optional component and not part of the measuring device 1. In case there is no device under test 10 present, the radar signal 14 can also be supplied by any external signal source. Also a generation of the radar signal 14 by the fading unit 17 itself is possible.

Further, regarding the fading unit 17, in the example depicted in FIG. 1, the spectrum analyzer 11 receives the radar signal 14, and generates a digital radar signal 15 therefrom. The signal generator 12 receives the digital radar signal 15 and generates the analog synthetic radar signal 16 by performing at least a frequency shift of the digital radar signal 15 and modulating it to an analog signal.

The function block 13 then receives the synthetic radar signal 16, and digitizes it, resulting in a digital radar signal, which it stores it in the storage unit 148. The known reference signal is also stored in the storage unit 148. The function block 13 performs a filtering of the digital radar signal with the radar compression filter 136. By way of example, coefficients of the radar compression filter 136 are derived based upon the known digital reference signal based upon which the original radar signal was generated. The radar compression filter 136 can thus be a matched filter with regard to the pulse shape of the radar signal 14 emitted by the device under test 10.

This procedure is repeated for a number of times in order to determine the effect of different simulated Doppler shift frequencies on the radar signal 14. The resulting radar compression filter output signals are recorded and optionally displayed on a display device.

Figure 2:
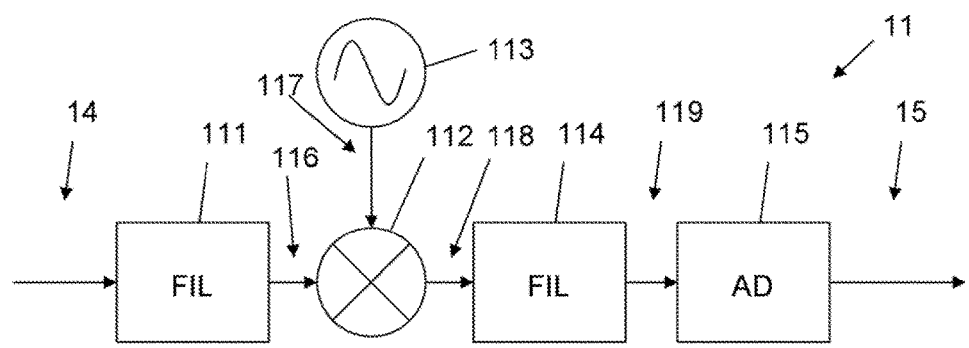
FIG. 2 shows a block diagram of an example spectrum analyzer of FIG. 1, in accordance with example embodiments.

Details regarding the inner workings of the spectrum analyzer 11 are given with regard to FIG. 2. Details with regard to the signal generator 12 are given with regard to FIG. 3. Details regarding the function block 13 are given with reference to FIG. 4.

FIG. 2 shows a block diagram of an example spectrum analyzer 11 of FIG. 1, in accordance with example embodiments of the present invention. The radar signal 14 is received by a filter 111, which generates a filtered radar signal 116 therefrom. The filtered radar signal 116 is provided to a mixer 112, which is also connected to a local oscillator 113. The local oscillator 113 provides a local oscillator signal 117, which is also provided to the mixer 112. The mixer 112 mixes the local oscillator signal 117 and the filtered radar signal 116, resulting in an intermediate frequency radar signal 118, which is provided to a further filter 114. The further filter 114 filters the intermediate frequency radar signal 118, resulting in a filtered intermediate frequency radar signal 119, which is provided to an analog-digital-converter 115. The analog-digital-converter 115 generates a digital radar signal 15 from the filtered intermediate frequency radar signal 119, and provides the digital radio signal to the signal generator 12.

Figure 3:
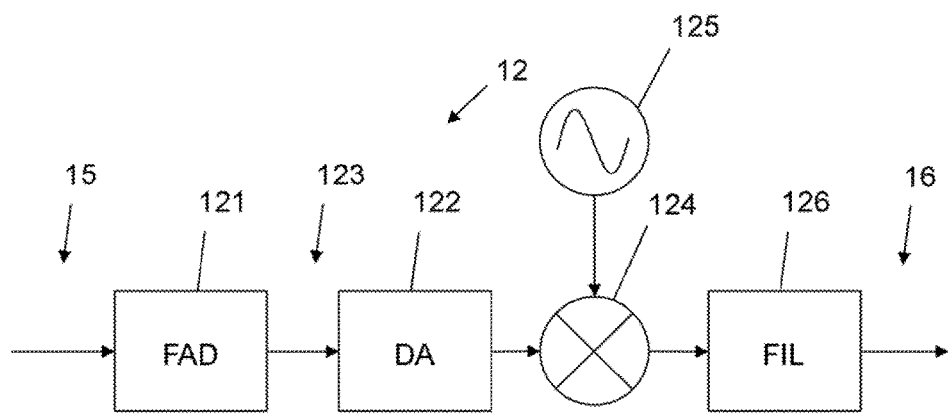
FIG. 3 shows a block diagram of an example signal generator of FIG. 1, in accordance with example embodiments.

FIG. 3 shows a block diagram of an example signal generator of FIG. 1, in accordance with example embodiments of the present invention. The digital radar signal 15 is provided to a fader 121, which adds a frequency shift to the digital radar signal 15 resulting in a frequency shifted digital radar signal 123. The signal 123 is provided to a digital-analog-convertor 122, which generates an analog signal 16 therefrom. The analog signal 16 is provided to a mixer 124, which also receives a local oscillator signal provided by a local oscillator 125. The mixer 124 mixes the analog signal with the local oscillator signal, resulting in a modulated signal. The modulated signal is provided to a filter 126, which performs a filtering, resulting in the analog signal 16, which is comparable to the original radar signal 14, but is frequency-shifted by a simulated Doppler shift frequency.

Figure 4:
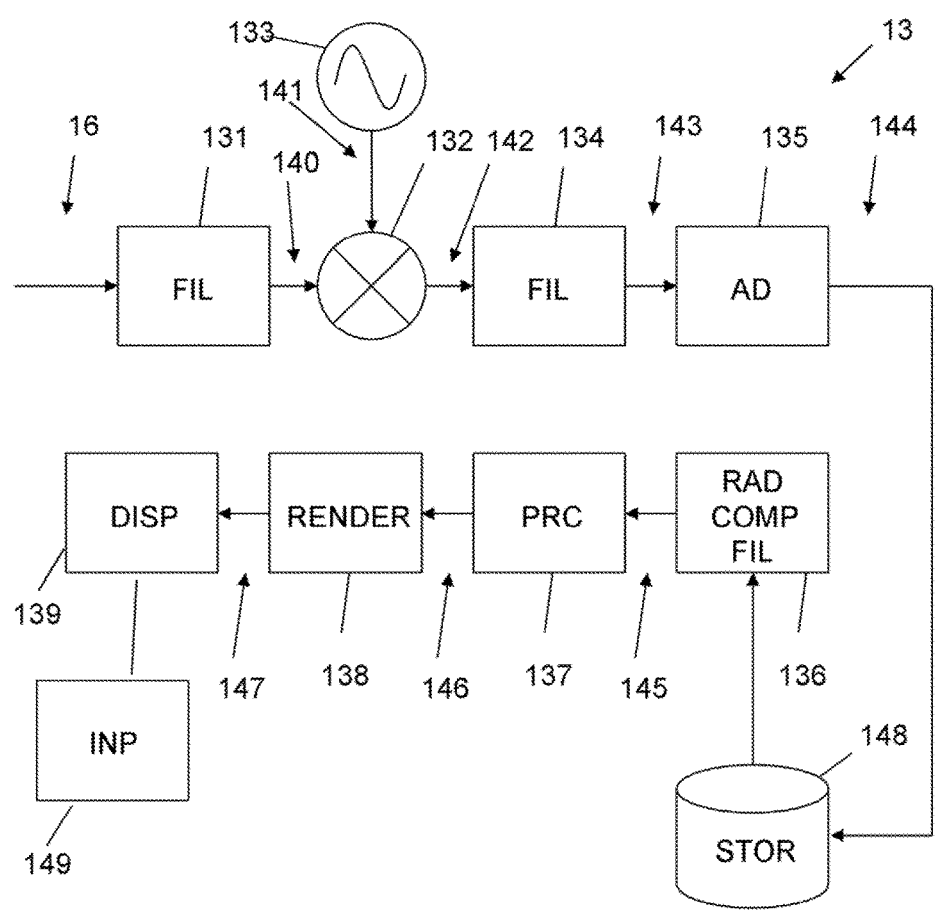
FIG. 4 shows a block diagram of an example of the function block 13 of FIG. 1, in accordance with example embodiments.

FIG. 4 shows a block diagram of an example of the function block 13 of FIG. 1, in accordance with example embodiments of the present invention. The synthetic radar signal 16 is provided to a filter 131, which performs a filtering and thereby generates a filtered synthetic radar signal 140. The filtered synthetic radar signal 140 is provided to a mixer 132, which also receives a local oscillator signal 141 from a local oscillator 133. The mixer 132 mixes the local oscillator signal 141 and the filtered synthetic radar signal 140, resulting in an intermediate frequency filtered synthetic radar signal 142. The intermediate frequency filtered synthetic radar signal 142 is provided to a further filter 134, which filters the signal, resulting in a filtered intermediate frequency radar signal 143. The signal 143 is provided to an analog-digital-convertor 135, which performs an analog-digital-conversion resulting in a frequency shifted digital radar signal 144, which is provided to a storage unit 148. The storage 148 stores the frequency shifted digital radar signal as well as an original reference signal, from which the radar signal 14 was generated.

The storage unit 148 is also connected to a radar compression filter 136. Filter coefficients of the radar compression filter 136 are set according to the original reference signal stored in the storage unit 148. This means that the filter coefficients are set so that the radar compression filter 136 is a matched filter with regard to the original reference signal in a digital form. By way of example, the reference signal is identical to the radar signal 14 emitted by the device under test 10. The radar compression filter 136 performs a filtering of the frequency shifted digital radar signal 144 stored within the storage unit 148. Since the frequency shifted digital radar signal 144 is not identical to the digital radar signal 15, but differs by the frequency shift, the radar compression filter is at least slightly mismatched.

A resulting radar compression filter output signal 145 is then provided to a processing unit 137, which is connected to the radar compression filter 136. The processing unit 137 performs a post processing of the radar compression filter output signal 145 (e.g., further filtering). Further, the processing unit 137 also stores the resulting radar compression filter output signal 145 until all desired Doppler shift frequencies have been processed. Accordingly, the foregoing processes of performing fading and filtering of the radar signal 14, via the radar compression filter 136, is performed for all desired Doppler shift frequencies. The resulting radar compression filter output signals 145 are then processed together by the processing unit 137.

The processing unit 137 provides a number of radar compression filter output signals 146 to a rendering unit 138, which is connected to the processing unit 137. The rendering unit 138 generates an image comprising the radar compression filter output signals 146. By way of example, the image is a three-dimensional image. This image 147 is provided to a display unit 139, which displays the image. The display unit 139 is connected to the rendering unit 138. By way of further example, the rendering unit 138 generates an ambiguity function as a three dimensional function and displays it on the display device 139.

According to such example embodiments, the display unit 139 may be a touch-screen display. Alternatively or additionally, a separate input device can be employed—such as a mouse, trackball or touchpad, or a speech recognition device. By use of this input device, a user can control the measurement of the radar signal 14. By way of example, the input device can be used to set parameters of determining the radar compression filter output signals 146 and the ambiguity function—such as a frequency range and or a time range and or a Doppler frequency shift range and or a number of Doppler frequencies. By way of further example, the input device can also be used for setting parameters of the rendering—such as a frequency range, time range, Doppler frequency range, a number of Doppler frequencies, rotation of the ambiguity function, shading of the ambiguity function, and/or coloration of the ambiguity function.

According to the foregoing example embodiments described with respect to FIGS. 1-4, the Doppler shift of the radar signal was emulated by performing and actual fading of the radar signal before filtering it with the radar compression filter. Below, example embodiments employing an alternative to the foregoing type of processing are described with respect to FIG. 5. According to such embodiments, the radar signal is not changed by performing a fading, but rather the fading is emulated by performing a frequency shift of the reference signal, affecting the filter parameters of the radar compression filter.

Figure 5:
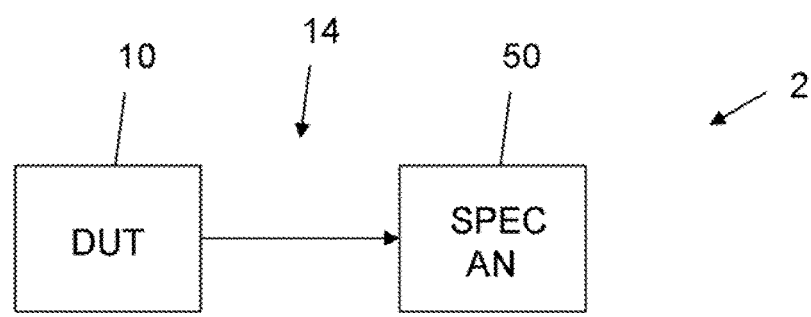
FIG. 5 shows a block diagram of a second example measuring device, in accordance with example embodiments.

FIG. 5 shows a block diagram of a second example measuring device, in accordance with example embodiments. With reference to FIG. 5, the measuring device 2 comprises a function block 50, which is comparable to the function block 13 of FIG. 1. By way of example, similar to the function block 13 of FIG. 1, the function block 50 may be implemented as a spectrum analyzer. The device under test 10 generates the radar signal 14 and directly provides it to the function block 50 (e.g., the spectrum analyzer). In the case of a spectrum analyzer, the analyzer 50 operates in a similar fashion as the spectrum analyzer 13 of FIG. 1 and FIG. 4. In the embodiment of FIG. 5, however, a single radar signal 14 is processed instead of a number of different synthetic radar signals 16, as per the embodiments according to FIGS. 1-4. Also here it is possible to remove the device under test 10, and provide the signal 14 by a different source. Also a generating of the signal 14 by the function 50 is possible.

Since the overall structure of the function block 50 according to this embodiment is similar to that of FIG. 4, the specific function is described here with reference to FIG. 4. The single radar signal 14 passes the filter 131, the mixer 132, the filter 134 and the analog-digital-converter 135, as described above with respect to FIG. 4, and is stored in the storage unit 148 as digital radar signal. In order to determine the radar compression filter output signals 146 for a number of different Doppler shift frequencies, a frequency shift of the reference signal is performed. This is for example achieved by performing a resampling of the reference signal with different sampling rates. Also a mixing of the reference signal with different frequencies can provide the desired effect.

Then a filtering of the digital radar signal 144 is performed. The resulting signal 145 is stored by the processing unit 137. Next, the reference signal is modified by performing a frequency shift, as explained above. Then, a filtering of the same digital radar signal 144 is performed. Further, in this manner, a number of radar compression filter output signals 145 are collected by processing unit 137, which are provided to the rendering unit as a set of radar compression output signals 146. It is thereby possible to also determine the different compression filter output signals for different simulated Doppler shift frequencies, without requiring a dedicated fading unit.

Although the system shown in FIG. 5 requires a significantly lower complexity hardware implementation (eliminating the requirement for a dedicated fading unit), this implementation presents a tradeoff in that a greater processing capacity of the spectrum analyzer 50 is required, and also results in a relatively lower accuracy of the resulting measurement (e.g., since the fading unit, such as the fading unit 17 of FIG. 1, can perform further fading functions apart from performing the frequency shift). In other words, the embodiment of FIG. 5 is limited to performing fading in the sense of a frequency shift, while the embodiment of FIG. 1 allows for additional fading effects (e.g., an attenuation or a time shift or a superposition of several signal components).

Figure 6:
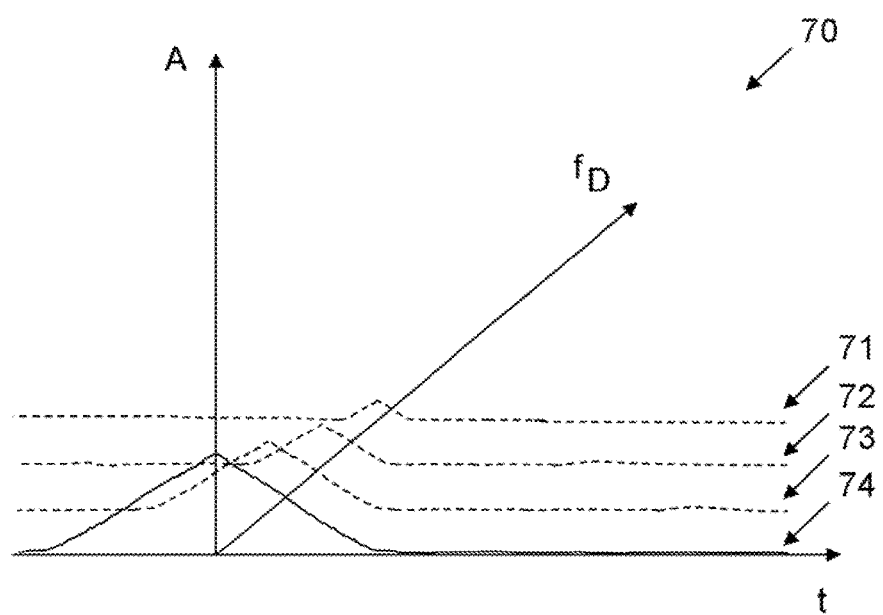
FIG. 6 shows a graph of an example ambiguity function, in accordance with example embodiments.

FIG. 6 shows a graph of an example resulting ambiguity function 70, in accordance with example embodiments of the present invention. The ambiguity function 70 is displayed in a three-dimensional diagram having time on the x-axis, an amplitude of the radar compression filter output signal on the x-axis and the Doppler frequency shift on the z-axis. Here, four radar compression filter output signals 171-174 are displayed together as the three-dimensional ambiguity function 70. The ambiguity function 70 can be displayed as a series of curves as shown here, but also it is possible to render a three-dimensional plane using shading and colors. Controlled by the input device, a user can further manipulate the displayed ambiguity function, for example, by rotating the ambiguity function, selecting specific aspects to focus on, and setting ranges of the different parameters to observe, etc.

Figure 7:
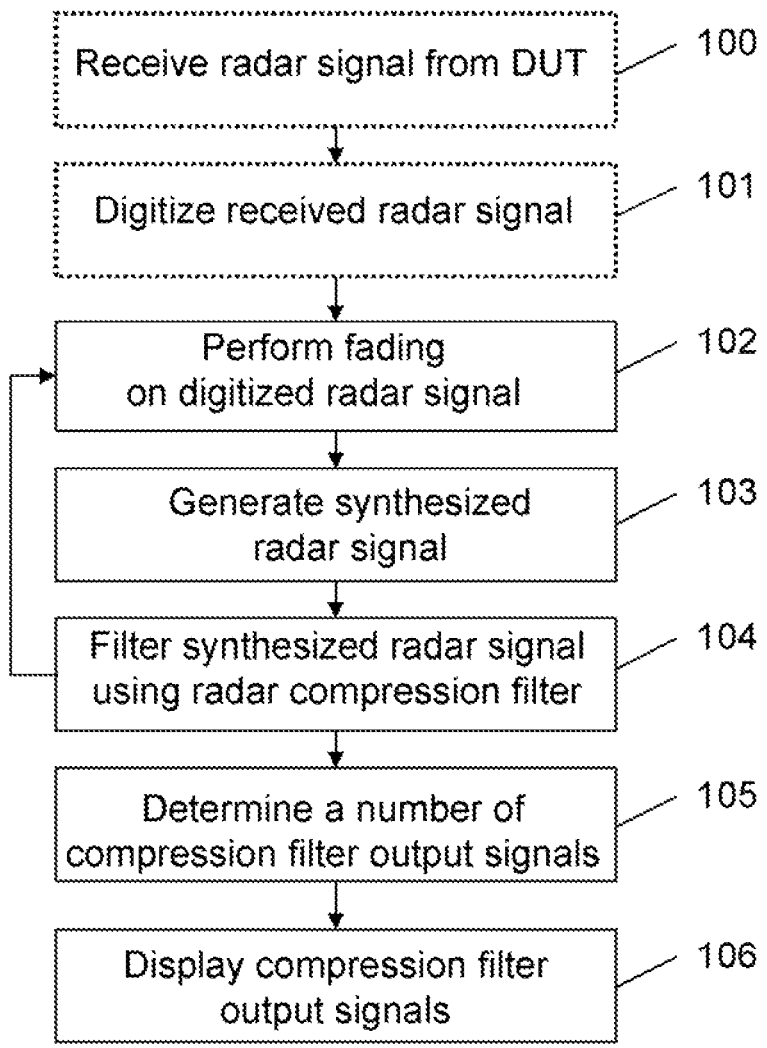
FIG. 7 shows a flow chart of a first example measuring method, in accordance with example embodiments.

FIG. 7 shows a flow chart of a first example measuring method, in accordance with example embodiments of the present invention. In step 100, a radar signal is received (optionally) from a device under test. The radar signal can also be received from a different signal source. Also is can be generated based on a known digital reference signal. In step 101, the received radar signal is digitized, and a fading is performed on the digitized radar signal in step 102. In step 103, a synthesized radar signal is generated based upon the fading performed in the previous step. By way of example, the synthesized radar signal is a radio frequency signal. In step 104, the synthesized radar signal is received by a radar compression filter resulting in a filtering of the synthesized radar signal. The steps 102-104 are repeated for each desired simulated Doppler shift frequency. When all desired Doppler shift frequencies have been processed, the following steps are performed. In step 105, a number of compression filter output signals are determined. Advantageously, an ambiguity function is determined from the radar compression filter output signals. In step 106, the resulting compression filter output signals, advantageously the ambiguity function, are displayed.

Figure 8:
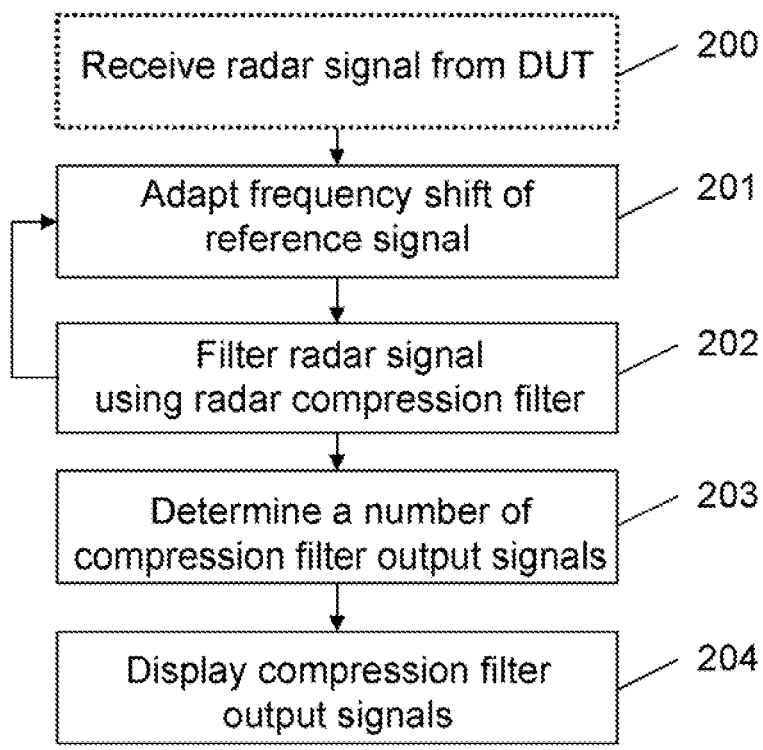
FIG. 8 shows a flow chart of a second example measuring method, in accordance with example embodiments.

FIG. 8 shows a flow chart of a second example measuring method, in accordance with example embodiments of the present invention. In an optional first step 200, a radar signal is received from a device under test. Alternatively, the radar signal can be received by a different signal source. Also a generation of the radar signal instead of receiving it, is possible. In step 201, a frequency shift of a known digital reference signal is modified to a new value. The frequency shift corresponds to a desired simulated Doppler frequency shift. In step 202, the radar signal is filtered using a radar compression filter. Steps 201 and 202 are repeated for all desired simulated Doppler shift frequencies. When all Doppler shift frequencies have been processed, in step 203, a number of compression filter output signals are determined, and displayed in step 204. Advantageously, in step 203, an ambiguity function is determined and displayed in step 204.

Since the measuring device of the first aspect of the invention and the measuring method of the second aspect of the invention very closely relate to each other, the individual details of the implementation shown regarding the device are also relevant for the shown embodiment regarding the method.

Figure 9:
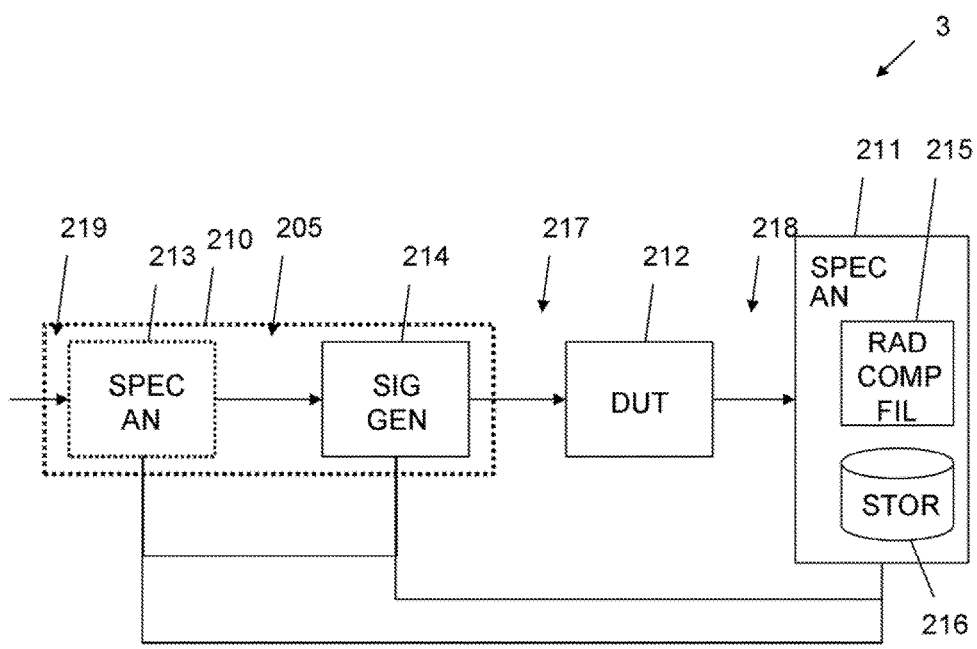
FIG. 9 shows a block diagram of second example measuring device, in accordance with example embodiments.

FIG. 9 shows a block diagram of second example measuring device, in accordance with example embodiments. A measuring device 3 is provided. By way of example, the term "measuring device" may encompass several entities, which can be located in one housing, but which can also be located in different housings. The measuring device 3 can also be constituted by a system of individual measuring devices. With reference to FIG. 9, a device under test 212 processes a received a synthetic radar signal 217, and responds by generating a measuring radar signal 218. The device under test 212 for example is an amplifier or a filter.

In a first example embodiment, the synthetic radar signal 217 is generated by a fading unit 210 from a known digital reference signal, which is stored within the fading unit 210. The fading unit 210 comprises at least a signal generator 214 for generating the synthetic radar signal 217 including the fading. Optionally, the fading unit 210 comprises a spectrum analyzer 213 connected to the signal generator 214. In this case, the fading unit 210 can receive a radar signal 219 and add fading to it, as was already shown along FIG. 1. In this case, the spectrum analyzer 213 receives the radar signal 219 and generates a digital signal 205 therefrom. This digital signal 205 is provided to the signal generator, which adds fading, as needed and generates the synthetic radar signal 217. Regarding the function of the fading unit 210, it is also referred to the elaborations regarding the fading unit 17 of FIG. 1.

The measuring radar signal 218 is received by a measuring device, for example by a spectrum analyzer 211. There it is processed, especially filtered by a radar compression filter 215.

The device under test 212 is provided with a number of synthetic radar signals 217 successively. Each one of these synthetic radar signals 217 is provided with a different amount of fading. The resulting measuring radar signals 218 are stored by a storage unit 216 within the measuring spectrum analyzer 211. The spectrum analyzer 211 determines the ambiguity function therefrom.

Alternatively, in a second example embodiment, there is no fading unit 210. In this case, the device under test 212 is directly provided with a radar signal 217, which is not amended by fading. The device under test 212 processes the radar signal 217 and reacts by producing a measuring radar signal 218. The measuring radar signal 218 provided to the measuring device 211, and the measuring device 211 then processes the received signal. By way of example, the measuring device 211 adds a frequency shift to the reference signal, and the radar compression filter 215 filters the measuring radio frequency signal 218. A number of different frequency shifts are performed successively. Resulting filtered signals are stored within the storage unit 216, and the ambiguity function is derived therefrom.

Also regarding the function of the spectrum analyzer 211, it is referred to the earlier elaborations regarding the spectrum analyzer 13 of FIG. 1.

Figure 10:
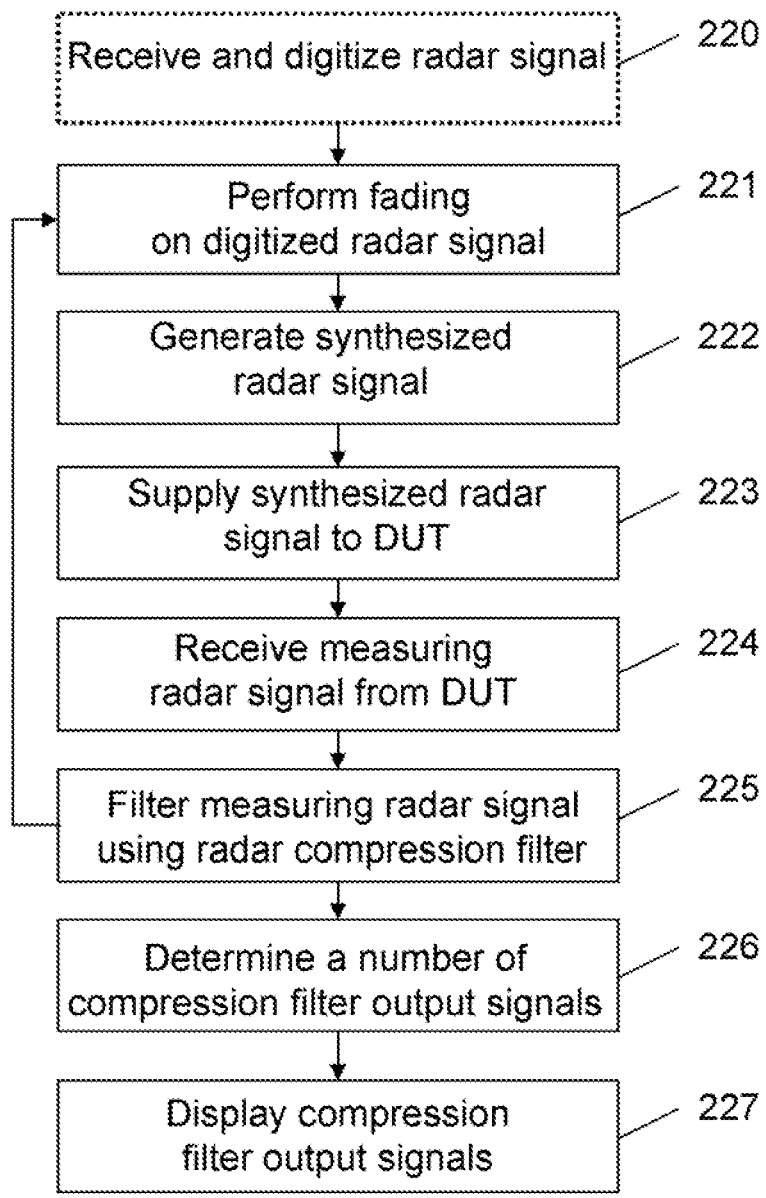
FIG. 10 shows a flow chart of a third example measuring method, in accordance with example embodiments.

FIG. 10 shows a flow chart of a third example measuring method, in accordance with example embodiments. In a first optional step 220, a radar signal is received and digitized. In step 221, fading is performed on the digitized radar signal. In case the first optional step is not performed, the fading is performed on a stored digitized radar signal. In step 222, a synthesized radar signal is generated from the digitized radar signal. In step 223, the synthesized radar signal is provided to a device under test, for example to an amplifier or filter. In step 224, a measuring radar signal is received from the device under test. In step 225, the measuring radar signal is filtered using a radar compression filter. The steps 221-225 are repeated until all necessary fading values have been covered. In step 226, a number of respective compression filter output signals are determined. In step 227, the compression filter output signals are displayed as an ambiguity function.

Figure 11:
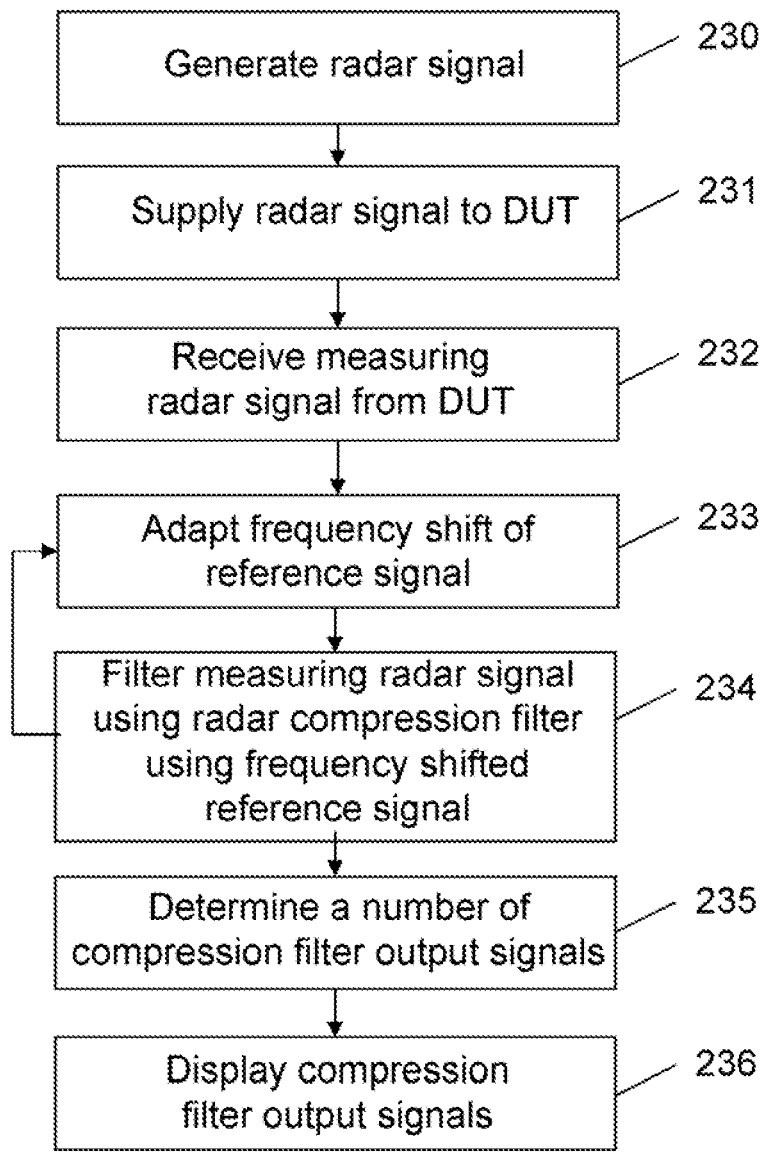
FIG. 11 shows a flow chart of a further embodiment of the measuring method of FIG. 10, in accordance with example embodiments.

FIG. 11 shows a flow chart of a further embodiment of the measuring method of FIG. 10, in accordance with example embodiments. In step 230, a radar signal is generated. In step 231, the generated radar signal is supplied to a device under test, for example an amplifier of filter. In step 232 a measuring radar signal is received from the device under test, which generates the measuring radar signal in reaction to the received generated radar signal. In step 233, a frequency shift of a reference signal is performed. In 234, a filtering of the measuring radar signal is performed. By way of example, the filtering is performed using a radar compression filter using the frequency shifted reference signal. A compression filter output signal is thereby generated. The steps 233-234 are repeated for all necessary frequency shifts. In step 235, a number of compression filter output signals are generated. In step 236, the compression filter output signals are displayed, for example as an ambiguity function.

Also regarding the function of the methods according to FIGS. 10 and 11, it is referred to the earlier elaborations regarding the methods according to FIGS. 7 and 8.

Since the measuring device of FIG. 9 and the measuring methods of FIGS. 10 and 11 very closely relate to each other, the individual details of the implementation shown regarding the device are also relevant for the shown embodiments regarding the respective methods.

Example embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like. Various embodiments of the present invention may also be implemented in the form of software modules, processes, functions, or the like which perform the features or operations described above. Software code can be stored in a memory unit so that it can be executed by a processor. The memory unit may be located inside or outside the processor and can communicate date with the processor through a variety of known means.

The invention is not limited to the examples and especially not to the specific hardware implementation shown in the examples. The characteristics of the example embodiments can be used in any advantageous combination. Further, although the present invention and its advantages have been described in detail with respect to the foregoing example embodiments, it should be understood, that various changes, substitutions and alterations can be made herein without departing from the spirit and scope of the invention as defined by the appended claims.

What is claimed is:

1. A measuring device for measuring a radar signal, wherein the radar signal is based on a digital reference signal, the measuring device comprising:
    a memory configured to store a digitized radar signal derived from the radar signal and the digital reference signal; and
    a radar compression filter configured to filter the digitized radar signal, resulting in a correlation of the digitized radar signal with the digital reference signal; and
    a frequency shifter configured to successively perform a frequency shift of either the digital reference signal or the radar signal with at least two simulated Doppler shift frequencies.

2. The measuring device according to claim 1, wherein the measuring signal is emitted by a device under test.

3. The measuring device according to claim 1, wherein the frequency shifter is configured to successively perform the frequency shift of the digital reference signal with the at least two simulated Doppler shift frequencies, and the radar compression filter is further configured to filter the digitized radar signal after each frequency shift, and the measuring device is configured to determine the correlation of the of the digitized radar signal with digital reference signal for each frequency shift.

4. The measuring device according to claim 3, wherein the measuring device is configured to measure an output of the radar compression filter based on each filtering of the digitized radar signal, and to determine an ambiguity function based on the measured outputs of the radar compression filter and the respective Doppler shift frequencies.

5. The measuring device according to claim 1, wherein the measuring device is configured to determine at least two compression filter output signals based on the at least two simulated Doppler shift frequencies.

6. The measuring device according to claim 1, wherein the frequency shift is successively performed on the radar signal with each of the simulated Doppler shift frequencies, and the measuring device further comprises:
    a fader configured to perform the frequency shift of the radar signal with each of the simulated Doppler shift frequencies, and
    wherein the memory is configured to successively store each resulting frequency shifted radar signal as a digital radar signal, and the radar compression filter is configured to successively filter each of the digital radar signals after each frequency shift of the radar signal.

7. The measuring device according to claim 6, wherein the fader comprises:
    a spectrum analyzer configured to generate a further digital radar signal based on the radar signal; and
    a signal generator configured to generate a plurality of synthetic radar signals, each based on the further digital radar signal and a different respective one of the simulated Doppler shift frequencies, and
    wherein, after each frequency shift of the source radar signal, a signal derived from the respective synthetic radar signal is provided to the radar compression filter as each respective digital radar signal.

8. The measuring device according to claim 4, wherein the measuring device further comprises:
    a processor configured to measure an output of the radar compression filter for each digital radar signal resulting from the respective frequency shift of the source radar signal, and to determine an ambiguity function of the source radar signal based on the measurements of the radar compression filter outputs.

9. The measuring device according to claim 8, further comprising:
an image processor configured to render an image based on one or more of the output of the radar compression filter for each digital radar signal resulting from the respective frequency shift of the source radar signal and an output of the processor; and
a display configured to display the image rendered by the image processor.

10. The measuring device according to claim 1, further comprising:
a processor configured to determine an ambiguity function of the radar signal based at least in part on an output from the radar compression filter.

11. The measuring device according to claim 10, further comprising:
an image processor configured to render an image based on the ambiguity function; and
a display configured to display the image rendered by the image processor.

12. The measuring device according to claim 11, further comprising:
an input interface configured to accept and register user inputs.

13. The measuring device according to claim 12, wherein the input interface comprises one or more of a mouse, a touchpad, a touchscreen, a trackball, a speech recognition device, and a gesture recognition device.

14. The measuring device according to claim 11, wherein the determination of the ambiguity function is based on parameters, including one or more of a frequency range, a time range, a Doppler frequency shift range, and a number of Doppler frequencies, which are determined based on the user inputs.

15. The measuring device according to claim 14, further comprising:
an input interface configured to accept and register user inputs, and
wherein the parameters are configurable based on the user inputs.

16. The measuring device according to claim 11, wherein the image processor is configured to render the image based on parameters, including one or more of a frequency range, a time range, a Doppler frequency shift range, a number of Doppler frequencies, a rotation of the ambiguity function, a shading of the ambiguity function, and a coloration of the ambiguity function.

17. The measuring device according to claim 16, further comprising:
an input interface configured to accept and register user inputs, and
wherein the parameters are configurable based on the user inputs.

18. A method for measuring a radar signal, wherein the radar signal is based on a known digital reference signal, the method comprising:
storing a digitized radar signal derived from the radar signal and the known digital reference signal;
filtering the digital radar signal, by a radar compression filter, resulting in a correlation of the digitized radar signal with the digital reference signal; and
successively performing a frequency shift of either the known digital reference signal or the radar signal with at least two simulated Doppler shift frequencies.

19. A measuring device for measuring a reaction of a device under test (DUT) to a radar signal, wherein the radar signal is based on a known digital reference signal, the measuring device comprising:
a memory configured to store a digitized radar signal derived from a measured radar signal emitted by the DUT and the known digital reference signal; and
a radar compression filter configured to filter the digitized radar signal, resulting in a correlation of the digitized radar signal with the digital reference signal; and
a frequency shifter configured to successively perform a frequency shift of either the digital reference signal or the radar signal with at least two simulated Doppler shift frequencies.

20. A method for measuring a reaction of a device under test (DUT) to a radar signal, wherein the radar signal is based on a known digital reference signal, the method comprising:
storing a digitized radar signal derived from a measured radar signal emitted by the DUT and the known digital reference signal;
filtering the digitized radar signal, by a radar compression filter, resulting in a correlation of the digitized radar signal with digital reference signal; and
successively performing a frequency shift of either the known digital reference signal or the radar signal with at least two simulated Doppler shift frequencies.

\* \* \* \* \*